Feb. 13, 1968    S. KULAGA    3,368,431
NUT-RUNNING APPARATUS
Filed May 12, 1966    2 Sheets-Sheet 1

INVENTOR.
SYLVESTER KULAGA
BY
Barnes, Kisselle, Raisch & Choate
ATTORNEYS

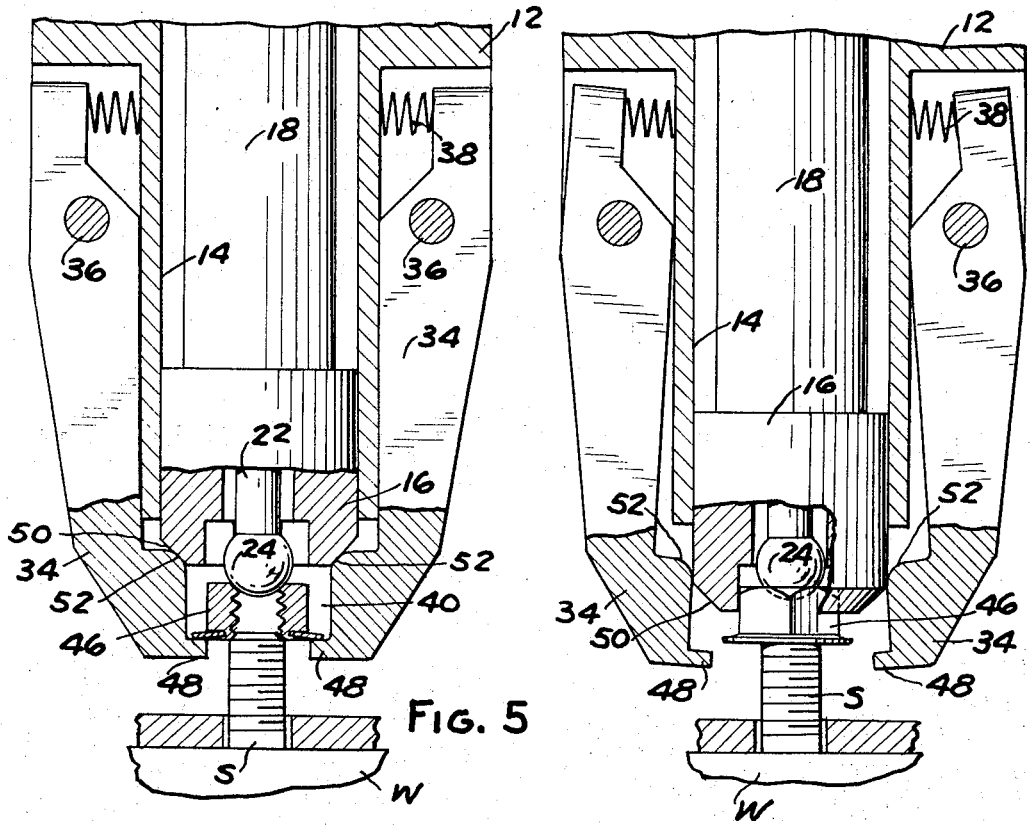

United States Patent Office 3,368,431
Patented Feb. 13, 1968

3,368,431
NUT-RUNNING APPARATUS
Sylvester Kulaga, Utica, Mich., assignor to Tru-Tork, Inc., Troy, Mich., a corporation of Michigan
Filed May 12, 1966, Ser. No. 549,658
7 Claims. (Cl. 81—54)

This invention relates to apparatus for running nuts onto bolts, threaded studs, and the like and, more particularly, involves a nut runner for types of nuts which are difficult to align properly to insure correct engagement of the threading thereon. Examples of such nuts are relatively thin nuts, which are inherently difficult to align, and nuts, thin or thick, of low quality wherein the threaded opening may be askew to external surfaces of the nut.

It is conventional to run a nut onto a bolt by means of a rotating socket fitting around the nut and advanced toward the bolt. In certain equipment, it is also conventional to provide mechanical jaws or the like which hold a nut in the path of advancement of the socket toward the work. A probe projecting forwardly of the socket passes through the hole in the nut and engages the work while the jaws are still engaged with the nut. Thereafter, the jaws disengage the nut. Upon continued advancement of the socket, the probe retracts relative to the socket, enabling the socket to advance for threading the nut home. The probe is relied upon to prevent the nut from tilting to a position in which the threads on the nut and work will not engage correctly.

A difficulty arises where the nut being applied is axially relatively thin. The probe must be small enough to pass freely within a nut whose opening has the smallest size within a given tolerance range. When a nut opening has a size which is at the maximum end of the tolerance range, the relatively thin nut can tilt or cock relative to the probe and work to such an extent that the threads on the nut cross those on the work rather than engaging them properly. Thus, when the socket runs the nut onto the work, a defective product results.

In a low quality nut, the threaded opening is sometimes askew to the end faces of the nut. For the same reason that the probe holds an accurately made nut against tilting out of proper alignment, the probe in this case prevents the nut from tilting into proper alignment with the work, particularly when the nut is relatively thick in an axial direction. Under these conditions, the nut and work threads cross rather than engaging correctly.

The object of the present invention is to provide a relatively simple, inexpensive nut-running apparatus improved to insure proper alignment and proper thread engagement between a work and a nut being applied thereto.

In general, the invention contemplates providing the end of the probe with a rounded surface having a diameter greater than that of the opening in the nut; and in effect, providing a universal joint between the nut and the probe when the nut is engaged at its opposite ends by the probe and the work. The surfaces on the nut and work which first interengage are the foremost threads of each. When these threads contact, they tend to tilt the nut to the angle of the threading. The universal joint facilitates this tilting and orients the nut to be properly run onto the work.

One form of the invention is shown in the accompanying drawings:

FIG. 5 is an enlarged fragmentary view similar to FIG. 3 but showing the parts in a different relation.

FIG. 6 is a view similar to FIG. 5 but showing the parts in a different relation.

FIG. 7 is a fragmentary view similar to FIGS. 5 and 6 but showing the relation of the parts after a nut has been run home.

Figure 1:
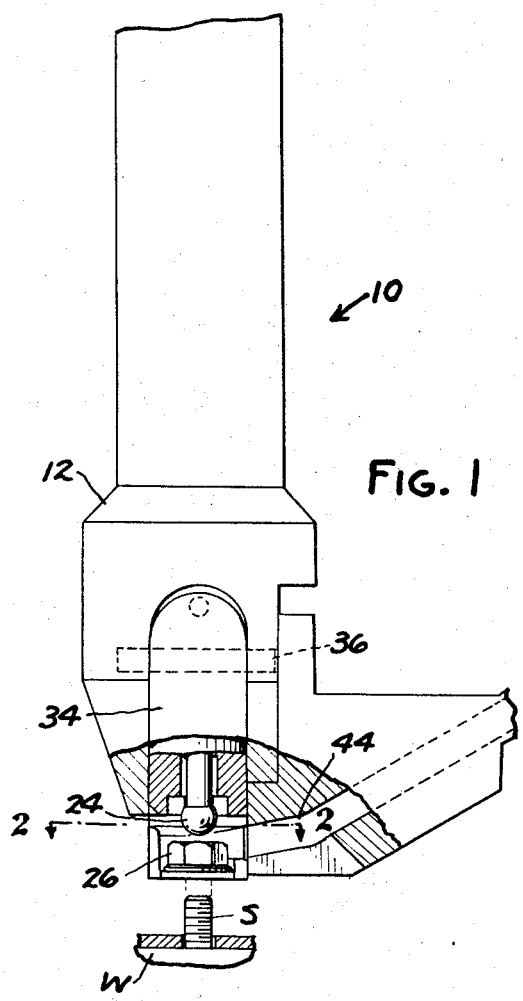
FIG. 1 is a partly diagrammatic elevational view of a nut runner according to the present invention, portions being broken away and shown in section to illustrate structural details.
Figure 2:
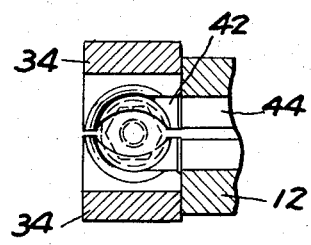
FIG. 2 is a fragmentary sectional view on line 2—2 of FIG. 1.

Shown in the drawings is a nut runner 10 according to the present invention supported by suitable means (not shown) above a workpiece W having an upwardly projecting threaded stud S. The nut runner has a body 12 defining an internal cylindrical guideway 14 for a nut-running socket 16 secured to a shaft 18 as by threading 20. Suitable motor means (not shown) are provided for rotating shaft 18 and socket 16 and for moving the same longitudinally within guideway 14.

A probe 22 is slidably mounted in a longitudinal bore 23 through socket 16, the probe having one rounded end portion 24 which projects out of the socket forwardly or downwardly, as the drawings are viewed. The probe is biased downwardly by a spring 26 which seats on a collar 28 on the upper end of the probe and reacts against the end 30 of a bore 31 in shaft 18. Collar 28 abuts the upper end of socket 16 and thereby contains the probe within the socket.

Body 12 has recessing 32 within which a pair of jaws 34 are pivotally mounted by means of pivot pins 36. The lower ends of the jaws are biased inwardly toward relatively closed relation by springs 38 compressed between body 12 and upper portions of the jaws.

Jaws 34 have opposed recessed portions which, in closed relation, cooperate to define a chamber 40 having a side inlet 42 aligned with a passageway 44 in body 12 through which nuts 46 may be introduced one at a time into chamber 40. The jaws have spaced-apart shoulders 48 which, in closed relation of the jaws, cooperate to form the bottom of chamber 40. These shoulders are spaced apart a distance sufficient to permit stud S to engage the bottom portion of nut 46 while the nut is held within chamber 40.

Rounded probe end 24 has a diameter greater than the diameter of the opening through the nut. For this purpose, the probe is illustrated as being provided with a ball at is lower end, but any convenient means could be used for providing the rounded surface. For example, if the probe body itself had a large enough diameter, its end could be simply rounded inwardly.

Socket 16 has a cam surface 50 adjacent its lower end positioned for engagement with shoulders 52 on jaws 34 when the socket is advanced downwardly in guide 14.

Figure 3:
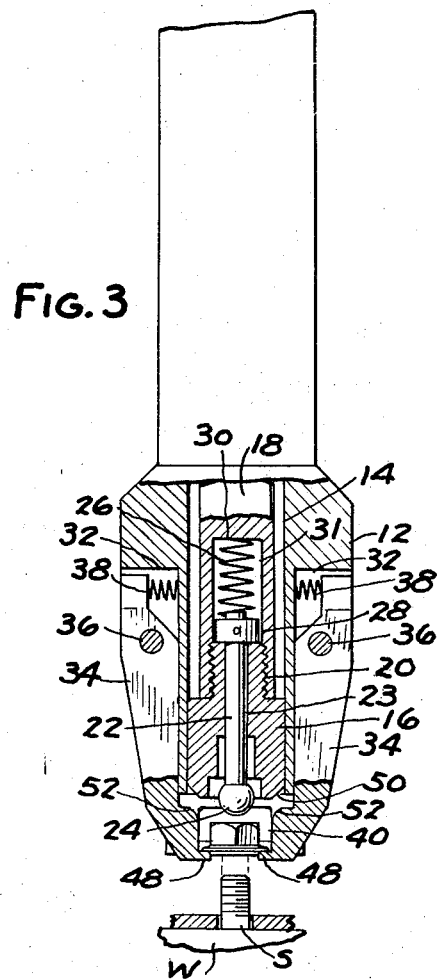
FIG. 3 is a partly diagrammatic view of the apparatus with a portion shown in elevation and a portion shown in section along a line generally perpendicular to the section of FIG. 1.
Figure 4:
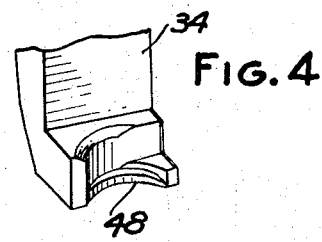
FIG. 4 is a fragmentary perspective view of the lower end of a nut-holding jaw.

In use, it may be assumed that the nut runner 10 is positioned above the workpiece with socket 16 and probe 24 retracted above a nut contained in the jaws 34 as shown in FIGS. 1 and 3. Socket 16 is rotated and advanced downwardly in guide 14, and nut runner 10 and workpiece W are closed toward each other either by lowering the nut runner, raising the workpiece, or both. Probe end 24 engages the portion of nut 46 defining the upper end of the opening therein, and this engagement is generally on a circular line of contact. Stud S passes through the opening between shoulders 48 and engages or very nearly engages the bottom of nut 46. The parts are now in the position shown in FIG. 5.

Upon continued downward advancement of socket 16, cam surfaces 50 and 52 interengage and spread jaws 34 open to the FIG. 6 position wherein shoulders 48 are retracted from beneath the nut. If the nut and stud S were not actually engaged previously, they interengage at this time. Whenever the nut engages the stud, the surfaces thereof which first contact are the lowermost thread on the nut and the uppermost thread on the stud. When these threads interengage, they tend to tilt the nut to a position in which the threads engage flatly. The rounded surface 24 on the probe has sliding contact with the upper portion of the nut and thereby permits the nut to tilt to a position in which the contacting threads on the nut and stud seat flatly. The nut is then in the correct position for being properly threaded onto the stud.

After the nut has been correctly positioned in this manner, socket 16 advances downwardly into driving engagement around the nut (FIG. 6). In a terminal portion of downward movement of the socket cam surface 50 thereon engages shoulders 48 and shifts jaws 34 outwardly so that the socket can pass through the jaws and run the nut home on the workpiece (FIG. 7).

During advancement of socket 16 from the FIG. 5 position to the FIG. 7 position, probe 22 retracts into bore 31 in shaft 18. After the nut has been applied to workpiece W, socket 16 is retracted upwardly and the parts return to the relative position of FIGS. 1 and 3 under the action of springs 26 and 38. Upon introduction of a new nut 46 into chamber 40 through passageway 44, the process can be repeated to apply the nut to a new workpiece by advancement and retraction of the nut runner and socket relative to the workpiece in the manner described.

I claim:
1. Nut-running apparatus comprising,
a body provided with holding means adapted to hold a nut in axial alignment with a work such as a bolt or the like to which the nut is to be applied,
a rotatable socket on said body mounted for movement toward said holding means,
means providing a probe having a rounded portion with a diameter greater than the opening in a nut with which said apparatus is adapted to be used,
said probe, responsive to movement of said socket toward said holding means, being movable so that said portion thereof substantially concentrically engages portions of the nut defining one end of said opening therein,
said holding means being clear of portions of the nut adjacent the opposite end of said opening so that upon relative advancement of the apparatus and work toward each other, a nut in said holding means can be engaged at its opposite end portions by said probe and work,
said rounded portions of said probe providing a universal joint type connection with an engaged nut to facilitate tilting of the nut to the angle of the threading on said nut and work,
said socket, upon continued advancement thereof relative to said holding means, being operable to release said holding means and drivingly engage around a nut therein to apply it to the work.
2. The apparatus defined in claim 1 wherein said holding means comprises jaws mounted on said body for movement between closed and open relation to a nut, said jaws having open end portions in closed relation to so facilitate engagement of a nut therein with the work, said socket being operable to open said jaws and release a nut upon said continued advancement thereof.
3. The apparatus defined in claim 2 wherein said body has an inlet through which nuts may pass one at a time from an external source, said inlet having a downstream end adjacent said jaws, said jaws cooperating to define a chamber having an open side aligned to receive a nut from said inlet.
4. The apparatus defined in claim 3 wherein said socket and jaws are provided with interengageable surface portions which are cooperable to cam said jaws to said open relation responsive to said continued advancement of said socket.
5. The apparatus defined in claim 1 wherein said probe is mounted for movement both with and longitudinally relative to said socket, said probe being spring biased toward a position in which said rounded portion thereof projects out of said socket toward said holding means, said rounded portion being substantially axially aligned with said socket, said probe being retractable relative to said socket upon said continued advancement thereof when said rounded portion is so engaged with a nut.
6. The apparatus defined in claim 1 wherein said holding means comprises a pair of jaws pivotally mounted on said body for rocking movement between closed and open relation to a nut,
said jaws having open end portions in said closed relation to so facilitate engagement of a nut with the work,
said socket and jaws being provided with interengageable surface portions which are cooperable to cam said jaws to said open relation responsive to said continued advancement of said socket,
said probe being longitudinally slidably mounted on said socket and being spring biased to a position in which an end portion projects out of said socket toward a nut in said jaws,
said end portion providing said rounded portion of said probe and being substantially axially aligned with said socket,
said probe being retractable relative to said socket against said spring bias upon said continued advancement of said socket when movement thereof is obstructed by engagement with a nut so engaged with a workpiece.
7. The apparatus defined in claim 6 wherein said body has an inlet through which nuts may pass one at a time from an external source, said inlet having a downstream end adjacent said jaws, said jaws cooperating to define a chamber having an open side aligned to receive a nut from said inlet, said chamber being dimensioned and configured to hold a nut substantially concentric with said rounded surface portion of said probe.

References Cited
UNITED STATES PATENTS 2,763,173   9/1956   Bailey et al. _____ 81—54.3
2,872,836   2/1959   Zakrzewski _____ 81—54.3

JAMES L. JONES, Jr., *Primary Examiner.*